Nov. 15, 1960     H. T. DE MAN     2,960,126
POWER OPERATED CUTTING TOOL
Filed July 15, 1959     3 Sheets-Sheet 1
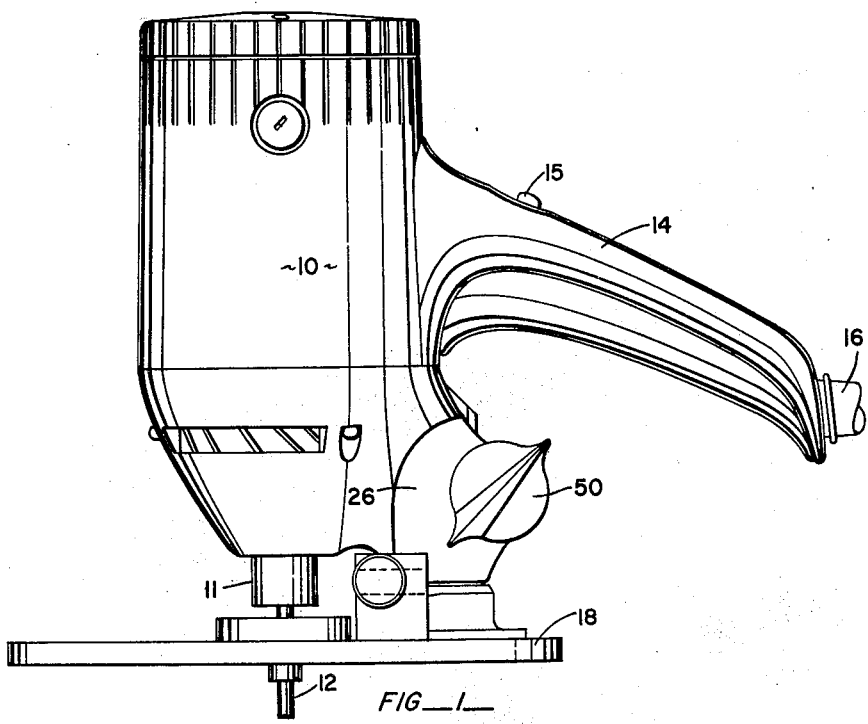
FIG__1__
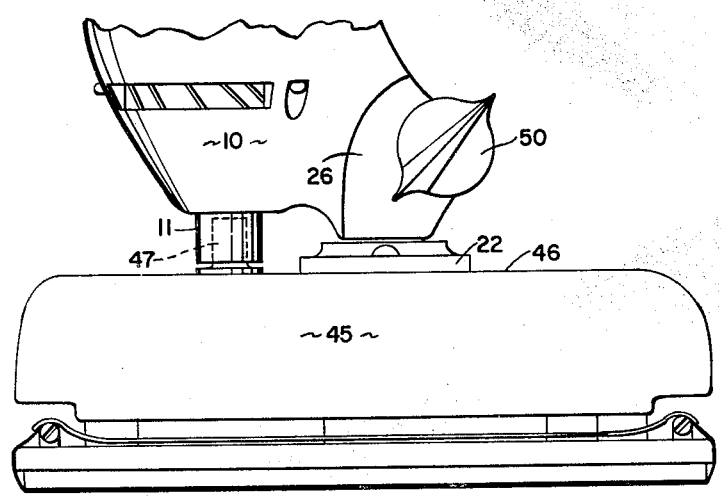
FIG__2__
INVENTOR.
Heiko T. de Man
BY
D. Emmett Thompson
ATTORNEY Nov. 15, 1960  H. T. DE MAN  2,960,126
POWER OPERATED CUTTING TOOL
Filed July 15, 1959  3 Sheets-Sheet 2
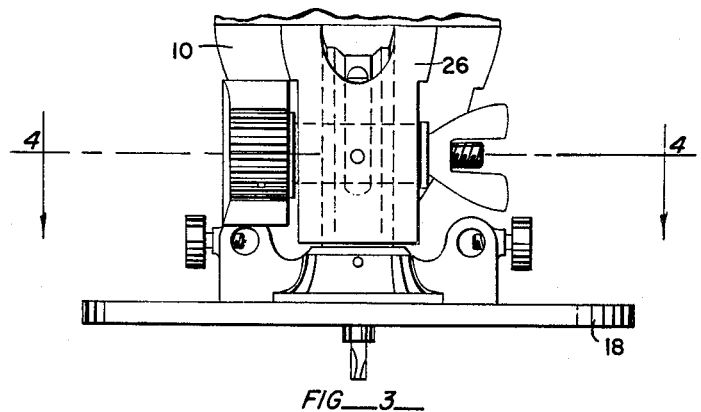
FIG_3_
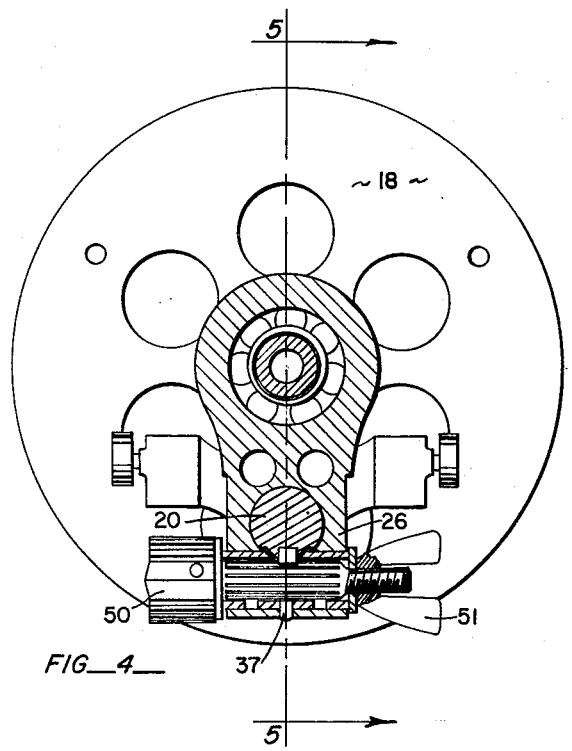
FIG_4_
INVENTOR.
Heiko T. de Man
BY
D. Emmett Thompson
ATTORNEY Nov. 15, 1960  H. T. DE MAN  2,960,126
POWER OPERATED CUTTING TOOL
Filed July 15, 1959  3 Sheets-Sheet 3
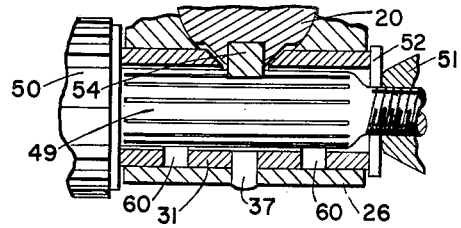
FIG__8__
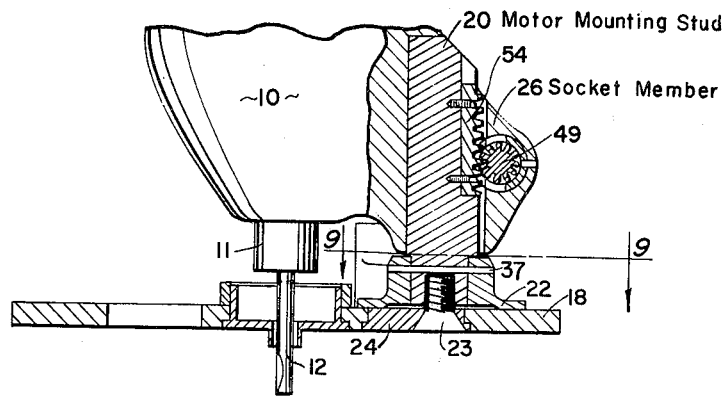
FIG__5__
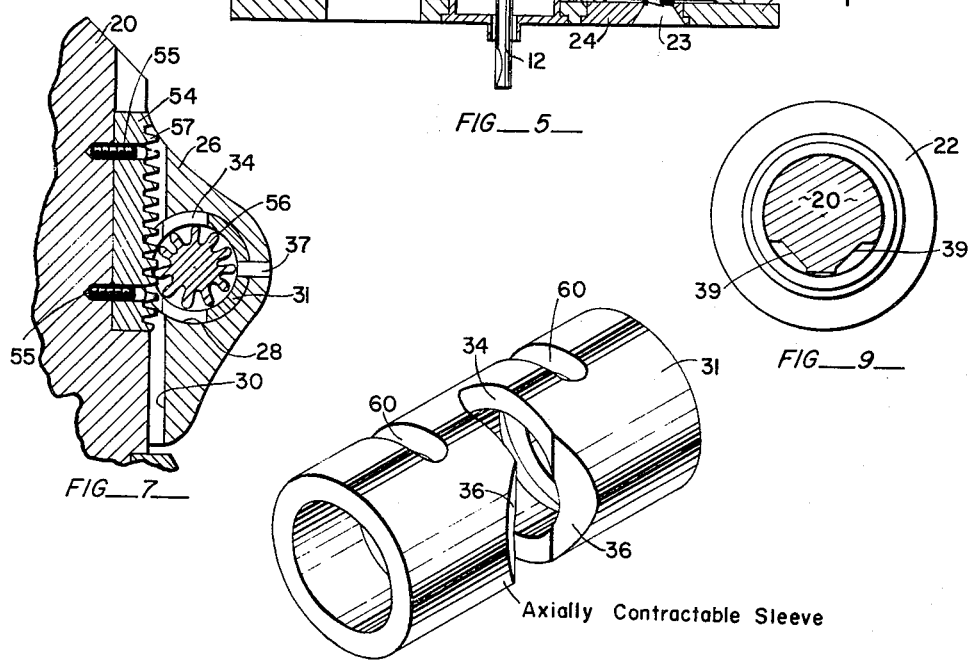
FIG__7__
FIG__6__
FIG__9__
INVENTOR.
Heiko T. de Man
BY
D. Emmett Thompson
ATTORNEY United States Patent Office 2,960,126
Patented Nov. 15, 1960

2,960,126
POWER OPERATED CUTTING TOOL

Heiko T. de Man, Liverpool, N.Y., assignor to The Porter-Cable Machine Company, Syracuse, N.Y., a corporation of New York Filed July 15, 1959, Ser. No. 827,350

4 Claims. (Cl. 144—134)

This invention relates to improvements in portable, power-operated tools, and more particularly in the structure for detachably mounting the operating motor on the base element of the tool. In many instances, to keep down the initial investment, the operating motor is detachably mounted on the base structure of the tool, whereby one motor may serve to power a number of different tool elements. In such instances, it is extremely important, when the motor is attached to the base element of the machine, that it be positioned thereon with precision, in order that the coupling elements between the motor and tool, or actuating shaft therefor, may be in proper alignment.

The invention has as an object a power operated tool embodying a structure by which the driving motor may be quickly and conveniently attached to the tool in a precise position or relation thereto and whereby the motor may be adjusted relative to the base of the tool without affecting the precision positioning of the motor.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a side elevational view of a portable, power-operated tool embodying my invention.

Figure 2 is a side elevational view partly broken away.

Figure 3 is a partial elevational view looking to the left, Figure 1, of the base element and contiguous portion of the motor housing.

Figure 4 is a sectional view taken on line 4—4, Figure 3.

Figure 5 is a side elevational view with parts in section, the section being taken on a line corresponding to line 5—5, Figure 4.

Figure 6 is a perspective view of the contractable sleeve.

Figure 7 is an enlarged sectional view of the upper right-hand portion of Figure 5.

Figure 8 is an enlarged sectional view of the lower portion of Figure 4, and

Figure 9 is a top plan view in section of the mounting stud.

In the drawings, the invention is illustrated in the form of a routing tool in Figure 1, and a sanding tool in Figure 2.

10 designates a motor housing illustrated as being normally vertically disposed and which contains an electric motor having a suitable collet or coupler 11 attached to the armature shaft of the motor for gripping and/or driving the tool element, such as a router bit 12, illustrated in Figures 1, 3 and 5, or the in-put shaft 47 of a sander, illustrated in Figure 2.

The motor housing 10 may be provided with a handle 14 for conveniently manipulating the tool, and containing a switch 15 for controlling the power supply to the motor supplied by the cord 16 entering the outer end of the handle.

In the router arrangement shown in Figures 1, 3, 4 and 5, the base element consists of a circular plate 18 for supporting the tool on the work piece. The router arrangement generally is of that type shown in Patent No. 2,714,408 to Pedersen, August 2, 1955. A stud 20 is fixedly secured to the plate 18. As shown in Figure 5, the lower end of the stud is secured to a circular flange 22 positioned on the upper surface of the plate 18, the stud being fixed to the plate by a screw 23 extending through a bushing 24 mounted in the plate 18 and threading into the lower end of the stud 20. However, it is obvious the stud 20 may be formed integral with or fixedly secured to the base plate by different arrangements. The housing 10 is provided or formed with a socket member 26 having a vertical bore extending parallel with the motor shaft for slidably receiving the stud 20.

The socket member 26 is also formed with a transversely extending aperture 28 which, on its inner side, breaks through the outer wall 30 of the bore whereby, at their medial portions, the bore and the aperture have communication. A sleeve 31 is positioned in the aperture 28. This sleeve is formed at its medial portion intermediate its ends with a transversely extending slot 34. The confronting side edges of this slot, or at least a portion thereof, are formed with flat surfaces 36, see Figure 6, converging inwardly toward the axis of the sleeve. The sleeve is positioned in the aperture 28 with the surfaces 36 confronting the stud, and is maintained in this position and against axial movement by a pin 37 extending through the outer wall of the aperture 28 of the socket 26 and extending into the outer wall of the sleeve 31 opposite to the slot 34. That is, the central or intermediate portion of the sleeve is fixed against axial movement in the passage 28.

The stud 20 is formed along its side, confronting the aperture 28, with axially extending surfaces 39 inclined and diverging from the axis of the stud. The angle on which the surfaces 39 of the stud is formed are complemental to the angle of the inclined surfaces 36 of the sleeve and when the stud is positioned in the socket member 26, the surfaces 39 extend vertically between the surfaces 36 of the sleeve, as better shown in Figures 4 and 8.

Because of the slot 34, the sleeve 31 is contractable when force is applied to the outer ends of the sleeve, causing the surfaces 36 of the slot to move into clamping engagement with the inclined surfaces 39 of the stud. Because of the angular inclination of the surfaces 36, 39, the stud 20 is moved inwardly against the inner wall of the vertical bore in the socket member, thus providing a considerable area of frictional engagement between the stud and the socket. In like manner, the surfaces 36 of the sleeve effect clamping action against the surfaces 39 on the stud.

The sander 45, illustrated in Figure 2, is of the reciprocating or orbital finishing type, as shown in my prior Patent No. 2,764,852, issued October 2, 1956. In this present arrangement, however, the sander is provided with the stud 20 extending upwardly from the top surface 46 for the reception of the motor housing 10 in place of the permanently attached motor shown in the patent referred to. The operating mechanism of the sander has an input shaft 47 which, when the motor housing 10 is mounted on the sander, becomes coupled with the collet member 11.

An important feature of this invention resides in the fact that the motor mounting described results in the output shaft of the motor being always located in a precise predetermined position relative to the fixed stud 20.

This is important, especially where the motor is coupled to a pre-located shaft, as the input shaft 47 of the sander 45. Due to the fact that the sleeve 31 is anchored in its medial portion by the pin 37, the contraction of the sleeve results in the surfaces 36 of the slot 34 always locating the motor housing in exactly the same relation to the stud 20 and this result is obtained with conventional manufacturing tolerances as, for example, in the machining of the stud and the stud receiving bore of the socket. The sleeve in its uncontracted condition, as shown in Figure 8, provides a slight clearance between the surfaces 36 and the surfaces 39, which permits ready mounting of the socket onto the stud but yet, upon contraction of the sleeve, the housing is always located in predetermined relation to the stud, whereby perfect alignment is effected with the shaft 47 of the sander and uniform positioning of the cutter 12 of the router.

The sleeve 31 is contracted by a member 49 mounted within the sleeve and being formed, or provided, at one end with an enlarged head portion 50 for engaging the contiguous end portion of the sleeve 31. The opposite end of the member 49 is threaded to receive a thumb nut 51 acting against a washer 52 engaging the opposite end of the sleeve. With this arrangement, when the nut 51 is tightened, the sleeve is contracted axially to move the surfaces 36 into clamping engagement with the surfaces 39.

In certain tools, such as the router arrangement, it is necessary to provide for axial adjustment of the motor toward and from the base plate 18. Such adjustment can be provided by a gear rack 54 attached to the stud 20, as by screws 55, and the middle portion of the clamping member formed with gear teeth 56 meshing with the teeth 57 of the rack 54. By this arrangement, rotation of the clamping member by the knob 50 effects vertical adjustment of the housing relative to the stud 20.

What I claim is:

1. A portable, power-operated, cutting tool comprising a base, a housing, a motor mounted in the housing for operating the cutting element of the tool, said housing having a socket portion formed with a bore and with an aperture extending normal to and communicating with said bore, a sleeve positioned in said aperture and being formed with a transverse slot extending through one side of that portion of the sleeve intermediate its ends, the edges of said slot converging inwardly toward the axis of the sleeve, the opposite side of said intermediate portion of said sleeve being fixed against axial movement relative to said socket portion, a stud fixedly mounted on said base for sliding axial movement in the bore of said socket portion, said stud having a V-shaped rib extending axially along one side thereof between the edges of the slot in said sleeve, the sides of said rib being formed complemental to said edges, said sleeve being contractable in an axial direction whereby, upon such contraction, the side edges of said slot are moved into clamping engagement with said rib, and a contracting member extending through said sleeve and operable to contract the same.

2. A portable, power-operated, cutting tool comprising a base, a housing, a motor mounted in the housing for operating the cutting element of the tool, said housing having a socket portion formed with a bore and with an aperture extending normal to and communicating with said bore, a sleeve positioned in said aperture and being formed with a transverse slot extending through one side of that portion of the sleeve intermediate its ends, the edges of said slot converging inwardly toward the axis of the sleeve, the opposite side of said intermediate portion of said sleeve being fixed against axial movement relative to said socket portion, a stud fixedly mounted on said base for sliding axial movement in the bore of said socket portion, said stud having a V-shaped rib extending axially along one side thereof between the edges of the slot in said sleeve, the sides of said rib being formed complemental to said edges, said stud and socket being provided with a rack and pinion structure operable to effect relative axial movement between said socket and stud, said sleeve being contractable in an axial direction whereby, upon such contraction, the side edges of said slot are moved into clamping engagement with said rib, and means operable externally of said socket for contracting said sleeve.

3. A portable, power-operated, cutting tool comprising a base, a housing, a motor mounted in the housing for operating the cutting element of the tool, said housing having a socket portion formed with a bore and with an aperture extending normal to and communicating with said bore, a sleeve positioned in said aperture and being formed with a transverse slot extending through one side of that portion of the sleeve intermediate its ends, the edges of said slot converging inwardly toward the axis of the sleeve, the opposite side of said intermediate portion of said sleeve being fixed against axial movement relative to said socket portion, a stud fixedly mounted on said base for sliding axial movement in the bore of said socket portion, said stud having a V-shaped rib extending axially along one side thereof between the edges of the slot in said sleeve, the sides of said rib being formed complemental to said edges, said rib being formed with a gear rack, a pinion journalled in said sleeve and meshing with said rack for effecting axial adjustment of said socket relative to said sleeve, said sleeve being contractable in an axial direction whereby, upon such contraction, the side edges of said slot are moved into clamping engagement with said rib, and means operable externally of said socket for contracting said sleeve.

4. A portable, power-operated, cutting tool comprising a base, a housing, a motor mounted in the housing for operating the cutting element of the tool, said housing having a socket portion formed with a bore and with an aperture extending normal to and communicating with said bore, a sleeve positioned in said aperture and being formed with a transverse slot extending through one side of that portion of the sleeve intermediate its ends, the edges of said slot converging inwardly toward the axis of the sleeve, the opposite side of said intermediate portion of said sleeve being fixed against axial movement relative to said socket portion, a stud fixedly mounted on said base for sliding axial movement in the bore of said socket portion, said stud having a V-shaped rib extending axially along one side thereof between the edges of the slot in said sleeve, the sides of said rib being formed complemental to said edges, said rib being provided with a gear rack, a pinion journalled in said sleeve and meshing with said rack, said pinion being formed with an enlarged head portion engaging one end of said sleeve, said sleeve being contractable in an axial direction whereby, upon such contraction, the side edges of the slot in said sleeve are moved into clamping engagement with said rib, and a member threaded on the opposite end of said pinion and operable when tightened to engage the opposite end of said sleeve for contracting the same.

References Cited in the file of this patent

UNITED STATES PATENTS

| 1,506,154 | Berthelsen et al. | Aug. 26, 1924 |
| 1,565,790 | Carter | Dec. 15, 1925 |
| 1,584,078 | Carter | May 11, 1926 |
| 1,742,217 | Renwick | Jan. 7, 1930 |
| 1,820,162 | Salvat | Aug. 25, 1931 |
| 2,582,573 | Von Lunten | Jan. 15, 1952 |
| 2,855,963 | Potter | Oct. 14, 1958 |

FOREIGN PATENTS

| 1,002,118 | Germany | Feb. 7, 1957 |